United States Patent [19]
Davis et al.

[11] Patent Number: 5,894,208
[45] Date of Patent: Apr. 13, 1999

[54] CONTROL FOR ELECTRICALLY ACTUATED SHIFTING MECHANISM

[75] Inventors: Alan R. Davis, Plainwell; Leo A. Kominek, Portage; Daniel P. Janecke, Kalamazoo; Donald J. Rozsi, Marshall, all of Mich.

[73] Assignee: Eaton Corporation, Cleveland, Ohio

[21] Appl. No.: 08/508,810

[22] Filed: Jul. 28, 1995

[51] Int. Cl.$^6$ ................................................. F16H 59/00
[52] U.S. Cl. ............................ 318/484; 318/9; 318/268
[58] Field of Search ........................... 74/745, 336, 335, 74/477, 473 R, 402; 388/815; 318/268, 269, 270, 276, 484, 461, 468, 474, 9

[56] References Cited

U.S. PATENT DOCUMENTS

| | | | |
|---|---|---|---|
| 3,723,840 | 3/1973 | Opal et al. | 318/432 |
| 3,781,616 | 12/1973 | Mokrytzki et al. | 318/803 |
| 4,296,362 | 10/1981 | Beasley . | |
| 4,754,665 | 7/1988 | Vandervoort | 74/745 |
| 4,873,881 | 10/1989 | Edelen et al. | 74/336 |
| 4,920,815 | 5/1990 | Reynolds | 74/335 |
| 4,969,756 | 11/1990 | Villec et al. | 388/815 |
| 5,000,060 | 3/1991 | Reynolds et al. | 74/745 |
| 5,050,427 | 9/1991 | Cote et al. | 73/118.1 |
| 5,053,959 | 10/1991 | Genise | 364/424.1 |
| 5,219,391 | 6/1993 | Edelen et al. | 74/335 |
| 5,268,623 | 12/1993 | Muller | 318/434 |

FOREIGN PATENT DOCUMENTS

| | | |
|---|---|---|
| 0600620 | 6/1994 | European Pat. Off. . |
| 0633095 | 1/1995 | European Pat. Off. . |
| 0638743 | 2/1995 | European Pat. Off. . |
| 0582415 | 2/1997 | European Pat. Off. . |

*Primary Examiner*—John W. Cabeca
*Attorney, Agent, or Firm*—Howard D. Gordon

[57] ABSTRACT

A control method/system for controlling the operation of an electric motor (32, 42) actuated shifting mechanism (28) is provided, which includes a procedure for periodically relieving trapped frictional forces in the shifting mechanism and associated linkages (30, 38, 40). At initiation of a shifting operation (60), or periodically (66) during a shifting operation, the level of energization of the electric motor is reduced from the full target energization level thereof (68) to a minimal level (70) for a relatively short period of time (72) and then returned to the target energization level thereof. Preferably, the level of energization is returned in a 2-step process comprising stepping the level of energization to an intermediate level (76) and then ramping the level of energization from the intermediate value to the level of full target energization thereof in a ramped fashion.

23 Claims, 3 Drawing Sheets

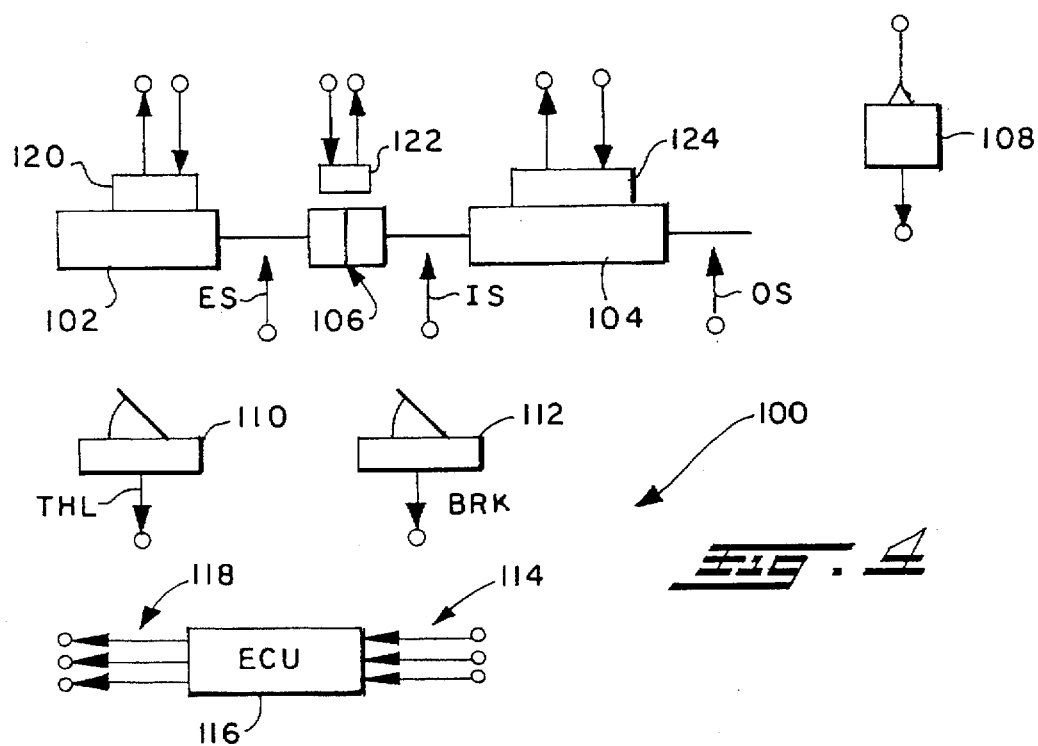
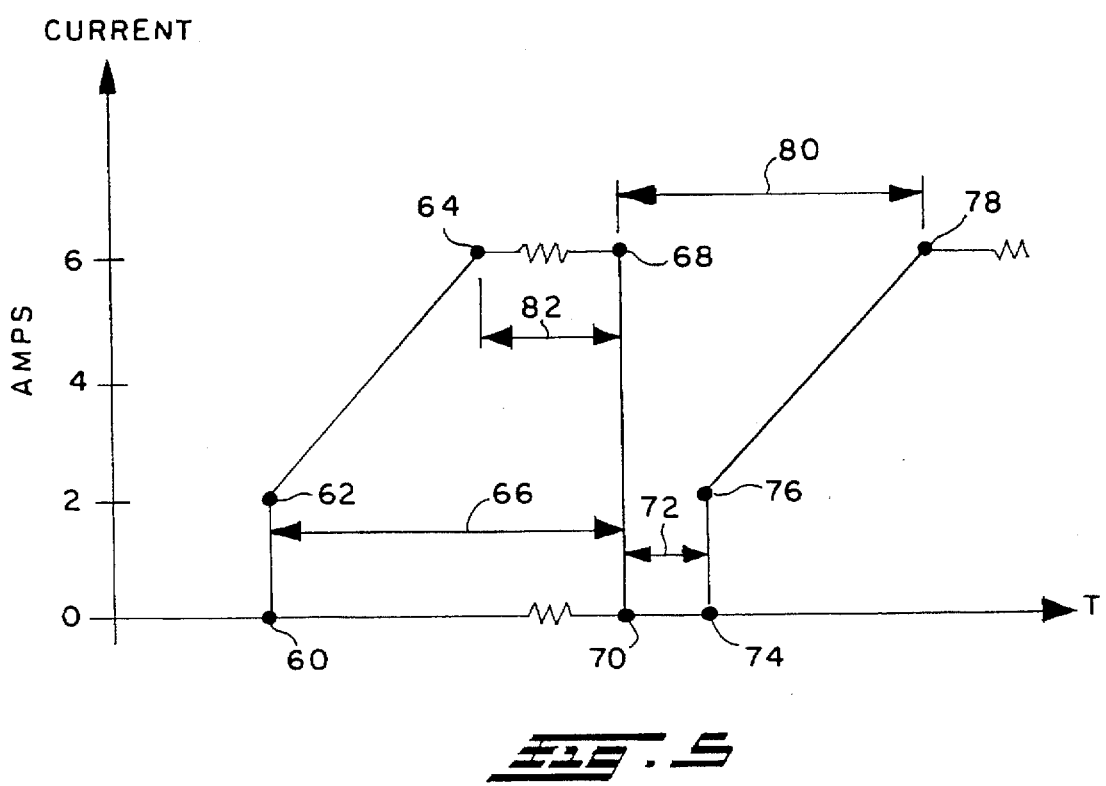

1

CONTROL FOR ELECTRICALLY ACTUATED SHIFTING MECHANISM

BACKGROUND OF THE INVENTION

1. Field of the Invention

The present invention relates to a control method/system for controlling the operation of electrically actuated shifting mechanisms such as, for example, electrically actuated X-Y shifting mechanisms for automated mechanical transmissions. In particular, the present invention relates to controls for electrically actuated shifting mechanisms which are effective to periodically relieve trapped frictional force in the shifting mechanisms.

2. Description of the Prior Art

Automated mechanical transmission systems utilizing shifting mechanisms controlled by command output signals from a system controller are well known in the prior art, as may be seen by reference to U.S. Pat. Nos. 4,361,060; 4,595,986; 4,648,290; 5,050,427 and 5,053,959, the disclosures of which are incorporated herein by reference. Such fully and partially automated systems are based on mechanical transmissions utilizing positive jaw clutches, which may or may not be synchronized, to selectively engage and disengage selected ratio gears, as seen in U.S. Pat. Nos. 4,754,665; 4,920,815 and 5,000,060, the disclosures of which are incorporated herein by reference.

Shifting mechanisms having a shift member, such as a shift finger or the like, movable along a single axis or along two perpendicular axes by the selective actuation of one or more electric motors also are known in the prior art, as may be seen by reference to U.S. Pat. Nos. 4,873,881 and 5,219,319. In such devices, the direction of rotation and/or the output torque of the electric motors, typically bidirectional DC motors, is a function of the polarity and/or amperage of the current applied to the motor.

While the prior art electric motor-actuated shifting mechanisms are generally satisfactory, they are subject to improvement, as the controls therefor typically stepped the motors immediately to and maintained the motors at the full target current, which often resulted in overshooting the intended force when a stop is encountered and did not provide for relieving the resultant trapped frictional forces.

SUMMARY OF THE INVENTION

In accordance with the present invention, the drawbacks of the prior art are minimized by the provision of a control for an electric motor-operated shifting mechanism which will periodically relieve trapped friction forces in the shifting linkages and mechanisms. The foregoing is accomplished by, at initiation of a shifting operation and/or periodically (such as once every 0.80 to 1.20 seconds) thereafter, causing the amperage applied to controlled electric motor to be reduced to a minimal amount for a very short period of time (such as to zero amps for 20–30 milliseconds), then stepped to an intermediate amperage (such as 2.0–3.0 amps) and ramped up to the desired full target current (such as about 6.0 amps).

Accordingly, it is an object of the present invention to provide a new and improved control for an electric motor-actuated shifting mechanism.

This and other objects and advantages of the present invention will become apparent from a reading of the detailed description of the preferred embodiment taken in view of the drawings.

BRIEF DESCRIPTION OF THE DRAWINGS

FIG. 4 is a schematic illustration of an automated mechanical transmission system of the type utilizing the control of the present invention.

FIG. 5 is a graphical representation of the control method/system of the present invention.

DESCRIPTION OF THE PREFERRED EMBODIMENT

Figure 1:
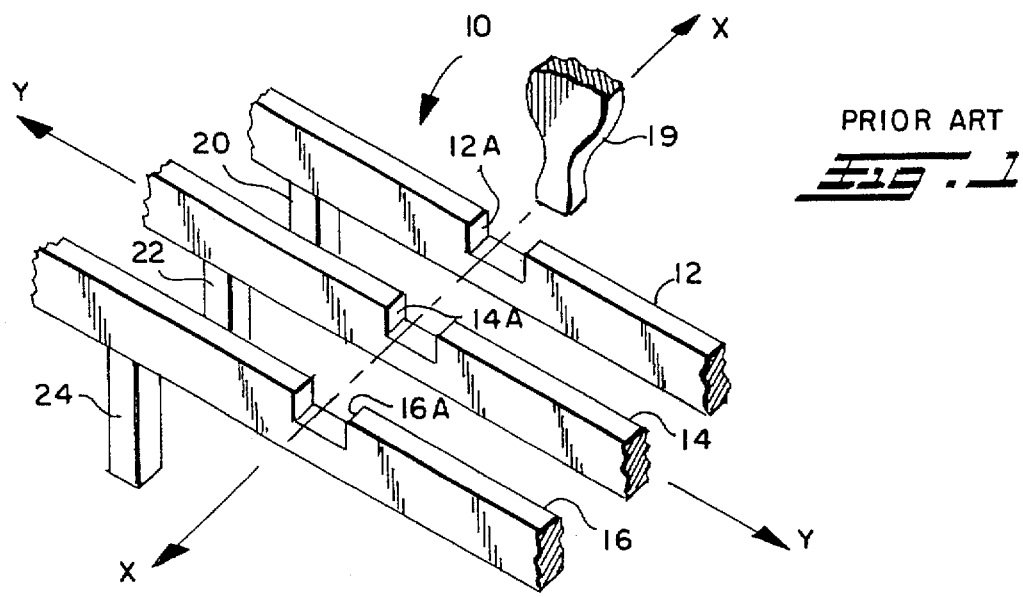
FIG. 1 is a schematic drawing of a typical mechanical transmission shift bar housing assembly that utilizes the control of the present invention.

An automated mechanical transmission system 100 of the type advantageously utilizing the electrically actuated shifting mechanism control of the present invention may be seen by reference to FIG. 4. System 100 includes an internal combustion engine 102 driving an at least partially automated mechanical transmission 104 through a non-positive coupling, such as a master clutch 106. The driver will be provided with a shift control console 108, a manually operated throttle pedal 110, and a brake pedal 112, all of which may provide input signals 114 to a microprocessor-based control unit 116, which will process same according to predetermined logic rules to generate command output signals 118 to various system actuators, such as an engine fuel controller 120, a clutch operator 122, and a transmission shift actuator 124.

The various system actuators preferably will include means for providing feedback input signals 114 to system controller 116, and various sensors, such as sensors ES (for sensing engine speed), IS (for sensing input shaft speed), and OS (for sensing output shaft speed), will be provided for providing additional input signals 114 to the controller. As is well known, various elements of system 100 may communicate over data links conforming to industry protocols, such as SAE J1922, SAE J1939, ISO 11898 and the like.

Fully and partially automated mechanical transmission systems of the general type illustrated in FIG. 1 are known in the prior art, as may be seen by reference to aforementioned U.S. Pat. Nos. 4,361,060; 4,595,986; 4,648,290; 5,050,427 and 5,053,959.

Figure 1A:
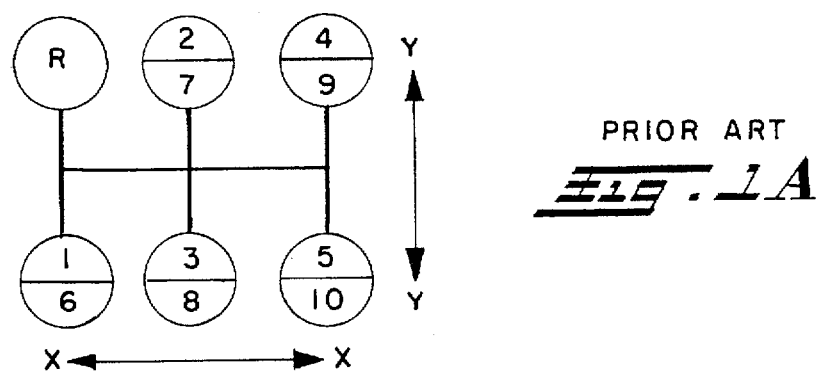
FIG. 1A is a schematic illustration of the shift pattern for the transmission of FIG. 1.

In FIG. 1, a typical shift bar housing assembly 10 comprising a plurality of generally parallel shift bars or shift rails is shown, which includes a reverse gear/first gear rail 12, a second/third gear rail 14 and a fourth/fifth gear rail 16. Each of the rails 12, 14 and 16 carries a shift fork 20, 22 and 24, respectively, fixed thereto for axial movement therewith. A typical "shift pattern" for the shift bar housing 10, as utilized in a 5×2 range transmission, is schematically illustrated in FIG. 1A.

Each of the shift rails carries a shift block mechanism 12A; 14A and 16A fixed thereto, which defines a pair of opposite strike surfaces, which may be engaged by a shift finger for selectively moving the shift rails, one at a time, in the Y—Y direction for selectively engaging and disengaging mechanical clutches associated with the transmission ratio gears, as is well known in the prior art.

Figure 2:
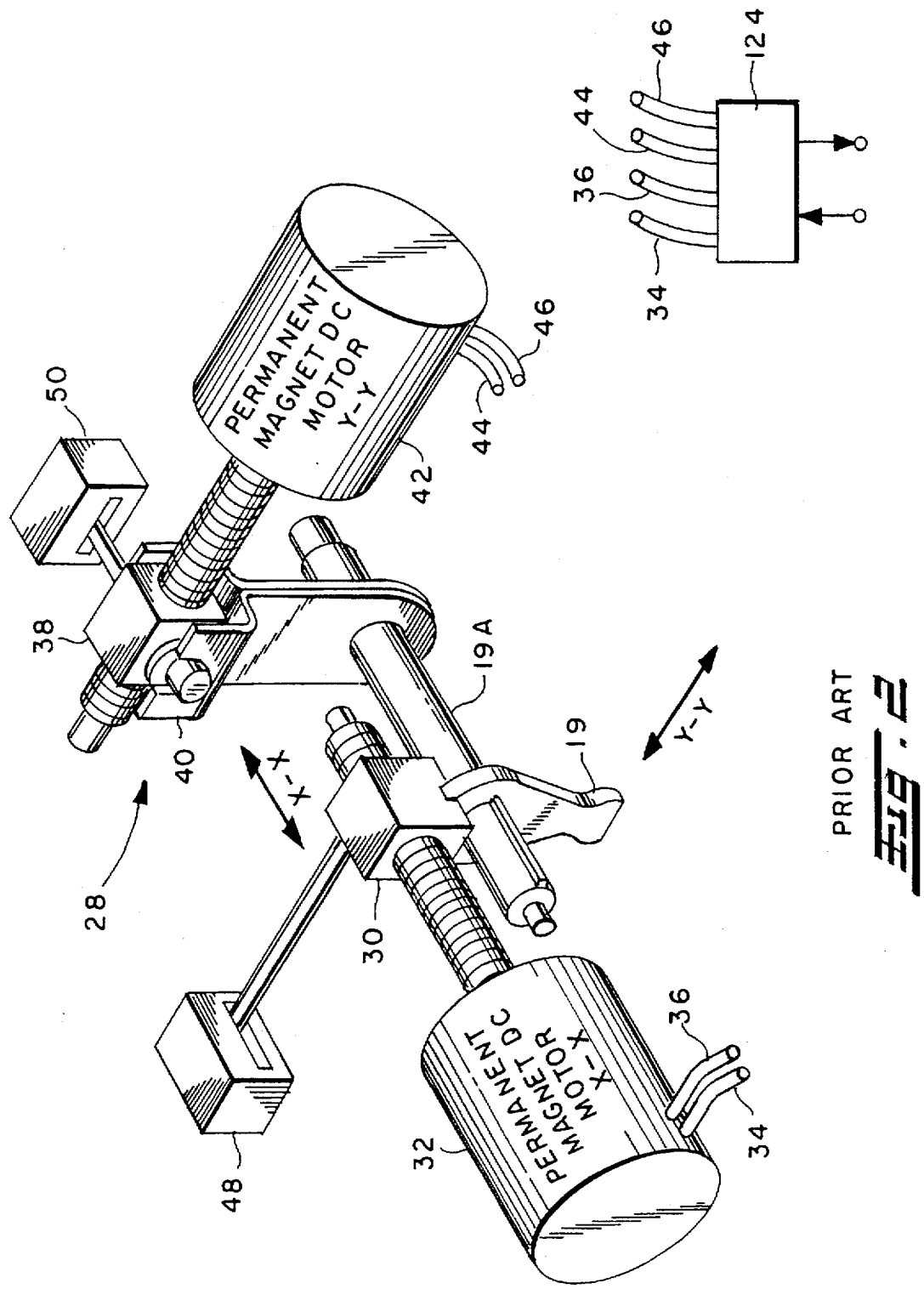
FIG. 2 is a schematic drawing of an electrically actuated shifting mechanism for use in connection with the shift bar housing assembly of FIG. 1.

FIG. 2 illustrates a typical electric motor-actuated X-Y shifting mechanism 28 of the type which is advantageously utilized with a shift bar housing assembly of the type illustrated in FIG. 1. It is understood, however, that the present invention is also applicable to electric shifting mechanisms utilized with other types of shifting mechanisms, such as the single shift shaft mechanism illustrated in aforementioned U.S. Pat. No. 4,920,815.

In FIG. 2, X-Y shifting mechanism 28 is operable to selectively move a shift finger 19 in the X—X selection direction to align the shift finger 19 with one of the shift block mechanisms 12A, 14A or 16A, and then in the Y—Y engaged/disengaged direction to selectively axially displace the selected shift rail and shift fork fixed thereto to selectively engage or disengage a positive jaw clutch. As may be seen, shift finger 19 is fixed to a shift shaft 19A for axial and rotational movement therewith. Briefly, shaft 19A, which is mounted for axial movement along and pivotable movement about its axis, is moved axially along its axis to move shift finger 19 in the X—X selection direction and is rotated about its axis to move shift finger 19 in the Y—Y engaged/disengaged direction.

Electrically actuated X-Y shifting mechanism 28 includes a ball screw mechanism 30, which is driven by a bidirectional permanent magnet DC motor 32 having electrical leads 34 and 36 for moving the shift finger 19 in the X—X direction. The shift mechanism also includes a ball screw mechanism 38 associated with a clevis mechanism 40 for causing rotation of shaft 19A about its axis to move the shift finger 19 in the Y—Y direction, which is driven by a bidirectional permanent magnet DC motor 42 having leads 44 and 46. The polarity and amperage of current in leads 34, 36, 44 and 46 is controlled by motor controller 124 in response to command output signals 118 from system controller 116. Position sensors 48 and 50 are provided to provide feedback signals indicative of the X—X and Y—Y positions, respectively, of the shift finger 19.

Figure 3:
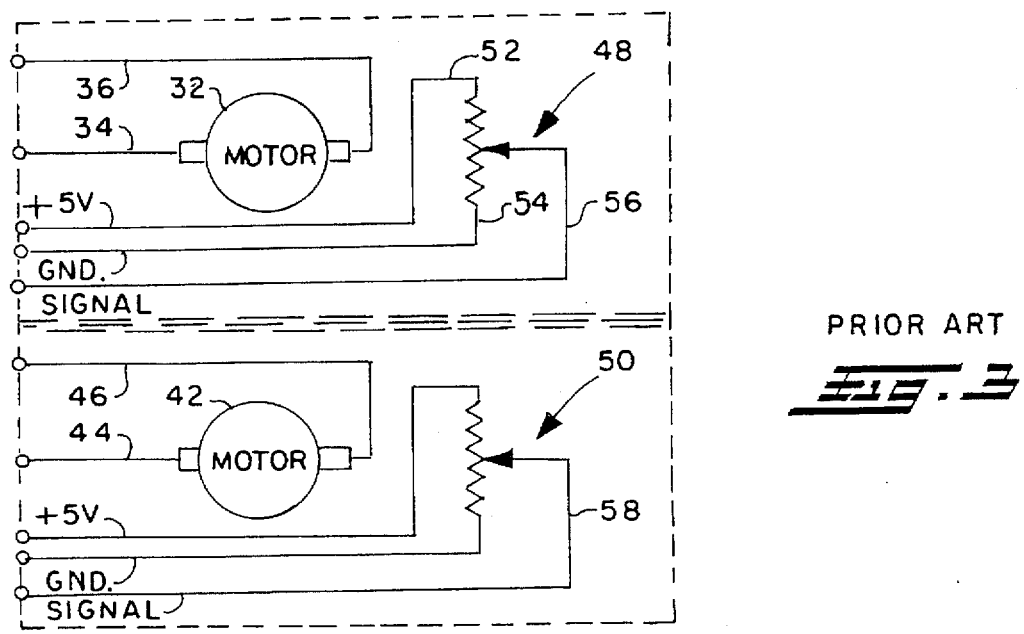
FIG. 3 is a portion of an electrical schematic diagram showing motors and position-feedback sensors for the electrically actuated shift actuator of FIG. 2.

FIG. 3 is a partial electrical schematic drawing of the motors 32, 42 and their respective position-measuring feedback devices 48, 50, respectively. Position-measuring device 48 is a variable resistor having a +5 V applied to one end of its terminal 52 and the ground potential applied to another terminal 54. An arm 56 of the variable resistor 48 moves in accordance with the position of the ball screw mechanism 30. The voltage on the arm 56 is an indication of the X—X position of the shift finger 19. Similarly, the position-sensing device 50 for the engagement/disengagement actuator is a variable resistor. Its movable arm 58 is mechanically connected with the ball screw mechanism 38 so that a DC voltage on the arm 58 is a measure of the position of the ball screw mechanism 38.

As is well known, the amount of torque applied to the ball screw mechanisms 30 and 38 is directly proportional to the amperage applied to motors 32 and 42, respectively. In the prior art controls for electric motor-actuated X-Y shift mechanisms of the type illustrated in FIG. 2, to cause movement of shift finger 19 in a particular direction, the amperage applied to the appropriate motor was stepped to the full target current thereof (typically about 6 amps for electrically actuated X-Y shifting mechanisms utilized in heavy-duty trucks and the like) and maintained at that level until the shift finger 19 was sensed as having moved to the selected position thereof. This method was not totally satisfactory, as the shift finger 19 tended to overshoot the intended force (as kinetic energy of motion was converted to potential energy upon encountering a stop) and trap frictional forces in the shift mechanisms and linkages without a control strategy to periodically relieve same.

In accordance with the present invention, at initiation of a shifting operation by one or both of the controlled electric motors and/or periodically during the shifting operation, the amperage applied to the controlled electric motor is reduced to a minimal level (preferably to zero amperage), is maintained at that level for a relatively short period of time, is then stepped to an intermediate amperage level and is then ramped back up to the full target level and maintained thereat until such time as the cycle is repeated. The foregoing has been found to provide a periodic procedure whereby trapped frictional forces in the shifting mechanisms and linkages may be relieved.

Referring to FIG. 5, a graphical representation of the control system/method of the present invention may be seen. For purposes of illustration, it is assumed that the controlled motor is electric motor 42 for causing shift finger 19 to move in the Y—Y engagement and disengagement direction. At the start, point 60, of the engagement/disengagement operation, the current applied to motor 42 is zero and is then stepped to an intermediate level (such as 2.0 to 3.0 amps), as may be seen at point 62, and is then ramped up to the desired full target amperage of 6.0 amps, as may be seen at point 64, and is maintained at that level until a period of time 66 from initiation of the cycle, at which time, point 68, the amperage is again reduced to zero amperage, as may be seen at point 70. Preferably, the period of time 66 is about 0.80 to 1.20 seconds.

The amperage is maintained at its reduced value for a relatively short period of time 72 and then is stepped back to the intermediate value, as may be seen at points 74 and 76, and then ramped back up to the full target amperage at point 78. Preferably, the relatively short period of time 72 during which the amperage is maintained at its zero value is about 20–40 milliseconds, and the period of time 80 from which the amperage is reduced from its full target level until it returns to its full target level is about 80 milliseconds. The amperage is maintained at the full target level thereof for an extended period 82 of about 0.60 to 1.20 seconds.

When engaging a selected jaw clutch associated with a target gear ratio, the amount of time required is typically less than 1.0 second in the absence of system abnormalities and, thus, other than at initiation, the above control will be required only in those gear-engagement operations which require a greater- than-normal period of time. However, during a typical disengagement operation, the jaw clutches will not disengage, regardless of the axial force applied thereto, until such time as a torque break occurs in the vehicle drivetrain. Accordingly, it is not unusual for the control of the present invention to cause a momentary drop in amperage applied to the actuator motor one or more times during a disengagement operation.

Although the preferred embodiment of the present invention has been described with a certain degree of particularity, the preferred embodiment is by way of example only and is not intended to be limiting.

We claim:

1. A method for controlling an electrically actuated transmission shifting mechanism including a selectively movable shifting member (19), a selectively energized electric motor (42) having a predetermined level of full target energization, a shift linkage (38/40) driven by said motor for selectively moving said shift member, a motor control (124) for selectively energizing said motor, and a system controller (116) for receiving input signals (114) and processing same in accordance with predetermined logic rules to issue command output signals (118) to system actuators including said motor control, said method comprising the steps of:

after a first period (82) of operating said motor at said level of full target energization thereof, causing the energization of said motor to be reduced to minimal value thereof for a second period (72); and then restoring said motor to said level of full target energization, said second period of time being less than said first period of time.

2. The method of claim 1 wherein said first period of time is at least 30 times greater than said second period of time.

3. The method of claim 1 wherein said first period of time is about 0.80 to 1.20 seconds, and said second period of time is about 0.020 to 0.030 seconds.

4. The method of claims 1, 2 or 3 wherein restoring said motor to said level of full target energization comprises stepping said motor to an intermediate level of energization, less than said level of full target energization, and then ramping energization from said intermediate value to said level of full target energization.

5. The method of claim 4 wherein said intermediate level of energization is about 20–40% of said level of full target energization.

6. The method of claims 1, 2 or 3 wherein said electric motor is a DC motor.

7. The method of claim 4 wherein said electric motor is a DC motor.

8. The method of claim 6 wherein said DC motor is a bidirectional motor.

9. The method of claim 7 wherein said DC motor is a bidirectional motor.

10. The control method of claims 1, 2 or 3 wherein said shifting mechanism is an X-Y shifting mechanism including a first electric motor for causing said shift member to be selectively moved in a first axial direction, and a second electric motor for causing said shift member to be moved in a second axial direction generally perpendicular to said first axial direction.

11. The control method of claim 4 wherein said shifting mechanism is an X-Y shifting mechanism including a first electric motor for causing said shift member to be selectively moved in a first axial direction, and a second electric motor for causing said shift member to be moved in a second axial direction generally perpendicular to said first axial direction.

12. The control method of claims 1, 2 or 3 wherein upon initiation of a selective movement of said shift member, said electric motor is caused to assume said minimal energization level thereof, is then stepped to said intermediate level of energization, and is then ramped to said level of full target energization.

13. The control method of claim 4 wherein upon initiation of a selective movement of said shift member, said electric motor is caused to assume said minimal energization level thereof, is then stepped to said intermediate level of energization, and is then ramped to said level of full target energization.

14. The control method of claim 9 wherein upon initiation of a selective movement of said shift member, said electric motor is caused to assume said minimal energization level thereof, is then stepped to said intermediate level of energization, and is then ramped to said level of full target energization.

15. A control system for controlling an electrically actuated transmission shifting mechanism including a selectively movable shifting member (19), a selectively energized electric motor (42) having a predetermined level of full target energization, a shift linkage (38/40) driven by said motor for selectively moving said shift member, a motor control (124) for selectively energizing said motor, and a system controller (116) for receiving input signals (114) and processing same in accordance with predetermined logic rules to issue command output signals (118) to system actuators including said motor control, said control system characterized by said system controller including logic rules for:

after a first period (82) of operating said motor at said level of full target energization thereof, causing the energization of said motor to be reduced to minimal value thereof for a second period (72) and then causing restoration of said motor to said level of full target energization, said second period of time being less than said first period of time.

16. The control system of claim 15 wherein said first period of time is at least 30 times greater than said second period of time.

17. The control system of claim 15 wherein said first period of time is about 0.80 to 1.20 seconds, and said second period of time is about 0.020 to 0.030 seconds.

18. The control system of claims 15, 16 or 17 wherein restoring said motor to said level of full target energization comprises stepping said motor to an intermediate level of energization, less than said level of full target energization, and then ramping energization from said intermediate value to said level of full target energization.

19. The control system of claim 18 wherein said intermediate level of energization is about 20–40% of said level of full target energization.

20. The control system of claims 15, 16 or 17 wherein said electric motor is a bidirectional DC motor.

21. The control system of claim 18 wherein said electric motor is a bidirectional DC motor.

22. The control system of claims 15, 16 or 17 wherein said logic rules further include logic rules for, upon initiation of a selective movement of said shift member, causing said electric motor to assume said minimal energization level thereof, to then step to said intermediate level of energization, and to then ramp to said level of full target energization.

23. The control system of claim 18 wherein said logic rules further include logic rules for, upon initiation of a selective movement of said shift member, causing said electric motor to assume said minimal energization level thereof, to then step to said intermediate level of energization, and to then ramp to said level of full target energization.

* * * * *